UNITED STATES PATENT OFFICE.

WHARTON B. McLAUGHLIN, OF NEW YORK, N. Y.

METALLIC COMPOUND FOR INTERNAL ADMINISTRATION.

1,226,229.  Specification of Letters Patent.  Patented May 15, 1917.

No Drawing.  Application filed August 5, 1916. Serial No. 113,316.

*To all whom it may concern:*

Be it known that I, WHARTON B. McLAUGHLIN, a citizen of the United States, and a resident of the city, county, and State of New York, have invented new and useful Improvements in Metallic Compounds for Internal Administration, of which the following is a specification.

This invention relates to metallic compounds to be administered internally to supply directly the metallic ingredient in a form to be immediately assimilated, in the treatment of such diseases and conditions as develop from the lack of the normal quantity of such metal.

For example, it is well known that the condition of extreme anemia is caused by a reduction of the normal iron content of the blood by even a small per cent. This condition can only be alleviated by increasing the iron content, which has heretofore been attempted by administering for prolonged periods various tonics containing iron in different forms. So incapable of assimilation is the iron in such tonics that months of treatment are always necessary to supply the few grains necessary to restore the blood to its normal condition.

I have discovered the reason for this condition to be a purely chemical reason, rather than physiological, as heretofore believed. It is well known to chemists that one of the most delicate reactions in chemical analysis, and frequently used in the analysis of mineral waters, is the detection of an iron salt by the conversion of the salt into an insoluble soap. When the water to be analyzed is treated with a soap solution, the iron salt, however small in quantity, is precipitated as an insoluble soap, every particle of the iron being recovered in the precipitate.

In the normal process of assimilation, the fatty constituents in the food are by the digestive process converted into soaps before they are absorbed by the tissue of the intestines, and as the process of assimilation is going on substantially at all times, a quantity of soap is always present in the upper intestine. The result is that the iron in the forms heretofore administered is converted into an insoluble iron soap incapable of assimilation and only such minute quantities as escape this chemical reaction are assimilated.

By my invention I reduce the iron to the form of soap and then dissolve the soap in a suitable solvent which may be directly administered. For instance, a solution of iron carbonate may be treated with a soap solution, precipitating the iron in the form of an iron soap. This precipitate can then be dissolved in a suitable fatty acid, for instance, stearic acid. If stearic acid is used it is preferably heated to liquefy it. The solution will harden when cooled and may be administered in capsule form.

I have found that sufficient iron may be administered in this form without ill effect to restore the normal hemoglobin content of the blood in two or three days' treatment. The reason why this compound is immediately assimilated, I believe, is as follows: The iron being already in the form of soap, is of course not chemically affected by the soluble soaps present in the intestines, and being in solution, is capable of immediate assimilation which takes place in considerable quantity before the stearic acid or other solvent is decomposed.

The same difficulty in administering lime exists, as in the case of iron, and presumably for the same reason, as lime is also precipitated in the form of insoluble soap from solutions containing minute traces of the lime salt. Many cases exist where it is desirable to increase the quantity of lime and this has been heretofore accomplished only by a slow treatment with mineral waters and other solutions of lime. By administering the lime in the form of dissolved lime soap, the normal lime content may be restored in a very short time.

The term "fatty acid" as heretofore employed is not used with a strictly accurate chemical significance. Some acids in the fatty acid series, according to the present approved standard classification of the organic acids, would not be suitable for the purpose. The desirable solvents for the purpose among the acids are those acids which would be termed "soap-forming," such as stearic, oleic, and palmytic acids, etc. Of these, stearic and palmytic are true fatty acids, while oleic is not. On the other hand, acetic acid is by derivation a fatty acid and would be unsuitable for the purpose.

While I have described specifically one method of producing my improved composition, it will of course be understood that other salts than the carbonate of iron or lime may be used, and various other solvents than stearic acid may be employed.

What I claim as new is:

1. A metallic compound for internal administration consisting of an iron or calcium soap dissolved in a sufficient quantity of a solvent inert and non-injurious in its therapeutic effect.

2. A metallic compound for internal administration, consisting of a solution of a calcium or iron soap in a soap-forming acid.

3. A metallic compound for internal administration consisting of a solution of an iron soap in stearic acid.

Signed at New York city, in the county of New York and State of New York this 3rd day of August, 1916.

WHARTON B. McLAUGHLIN.

Copies of this patent may be obtained for five cents each, by addressing the "Commissioner of Patents, Washington, D. C."